United States Patent [19]
Koenig
[11] Patent Number: 4,806,834
[45] Date of Patent: Feb. 21, 1989

[54] ELECTRICAL CIRCUIT FOR INDUCTANCE CONDUCTORS, TRANSFORMERS AND MOTORS

[75] Inventor: Earl Koenig, Averill Park, N.Y.
[73] Assignee: Donald Goodman, Fort Lee, N.J.; a part interest

[21] Appl. No.: 39,081
[22] Filed: Apr. 16, 1987
[51] Int. Cl.⁴ ............ H02P 8/00
[52] U.S. Cl. ............ 318/523; 318/138; 318/696; 336/182; 336/75; 336/145; 310/156; 310/162
[58] Field of Search ............ 318/138, 685, 687, 696, 318/254, 257, 439, 38, 523; 310/156, 162, 163, 49 R, 49, 184, 198, 166; 307/105, 104; 339/180, 182, 145, 146, 147; 381/117, 195, 203

[56] References Cited

U.S. PATENT DOCUMENTS

| | | | |
|---|---|---|---|
| 1,345,712 | 7/1920 | Stephens . | |
| 1,653,107 | 12/1927 | Kochling | 336/182 |
| 1,775,880 | 9/1930 | Whitlock . | |
| 1,873,975 | 8/1932 | Meyerhans | 336/145 |
| 2,082,121 | 6/1937 | Rypinski | 336/182 X |
| 2,283,711 | 5/1942 | Welch | 336/182 X |
| 2,415,022 | 1/1947 | Morrison | 310/162 X |
| 2,841,745 | 7/1958 | Shields | 310/156 X |
| 3,160,804 | 12/1964 | Quittner | 318/138 |
| 3,171,072 | 2/1965 | Adair | 318/138 |
| 3,214,662 | 10/1965 | Wolf | 318/138 X |
| 3,333,172 | 7/1967 | Brailsford | 318/138 |
| 3,346,792 | 10/1967 | Noumi | 318/138 |
| 3,418,563 | 12/1968 | Grosu | 336/147 X |
| 3,473,069 | 10/1969 | Herbert, III | 318/138 |
| 3,553,620 | 1/1971 | Cielo et al. | 336/180 |
| 3,573,606 | 4/1971 | Hart | 323/248 |
| 3,622,851 | 11/1971 | Hanada | 318/138 |
| 3,708,682 | 1/1973 | Erwin | 290/37 |
| 3,753,189 | 8/1973 | Allen | 336/182 X |
| 3,965,408 | 6/1976 | Higuchi et al. | 363/75 |
| 4,065,706 | 12/1977 | Gosling et al. | 318/138 X |
| 4,234,808 | 11/1980 | Geppert et al. | 310/49 R |
| 4,361,790 | 11/1982 | Laesser et al. | 318/696 |
| 4,473,811 | 9/1984 | Schaubley | 336/171 |
| 4,584,438 | 4/1986 | Koenig | 179/115.5 DV |
| 4,633,156 | 12/1986 | Bessen et al. | 318/696 |
| 4,636,666 | 1/1987 | Meins | 310/13 |

FOREIGN PATENT DOCUMENTS

| | | |
|---|---|---|
| 0041884 | 12/1981 | European Pat. Off. . |
| 0140461 | 5/1985 | European Pat. Off. . |
| 0213250 | 7/1908 | Fed. Rep. of Germany . |
| 0396395 | 5/1924 | Fed. Rep. of Germany . |
| 0573407 | 3/1933 | Fed. Rep. of Germany . |

OTHER PUBLICATIONS 55-130111-12/1980-Japanese Patent Abstract.

*Primary Examiner*—William M. Shoop, Jr.
*Assistant Examiner*—Paul Ip
*Attorney, Agent, or Firm*—Kenyon & Kenyon

[57] ABSTRACT

An electrical circuit for inductance conductors, transformers and motors is provided wherein two coils of electrically conductive wire are coiled about a bar of magnetizable material such that they are disposed in mirror image symmetrical relation with each other. A tap is connected to one end of each coil to conduct an electrical current thereto to magnetize the bar. A second tap is connected to the other ends of each coil to conduct an electrical current therefrom.

16 Claims, 1 Drawing Sheet

ELECTRICAL CIRCUIT FOR INDUCTANCE CONDUCTORS, TRANSFORMERS AND MOTORS

This invention relates to an inductance conductor. More particularly, this invention relates to an electrical circuit for an inductance conductor, a transformer, a generator and a motor.

As described in U.S. Pat. No. 4,584,438, an electrical circuit can be constructed with a pair of coils wound in mirror image symmetrical relation about a central plane so as to drive a diaphragm located in the central plane to provide a balanced and distortion free sound wave corresponding to an electrical signal delivered to the circuit.

It is also known that electromagnetism results from the passage of an electrical current through a wire which is wrapped around a core of magnetizable material. Generally, in the known electromagnetic structures, the curent enters the wire at one end, travels along the entire length of the wire, and exits at the other end of the wire with a magnetic force being produced as the current passes through the coil of wire. The magnetic force produced is usually associated with a proportional amount of work.

It is also known that an increase in magentic force and a corresponding increase in work output can be accomplished by increasing the flow rate of the current through the coil of wire.

Rotary motion motors or generators employ such coiled inductance conductors. These coiled induction structures are designed using a single wire wound and layered around a laminated core to reflect a desired resistance and inductive reactance.

As is known, a core transformer is based on the principle that energy will be transferred by induction from one conductor to another by means of a varying magnetic flux, provided that both conductors are on a common magnetic circuit. In the conventional transformer, a primary winding of wire is wound about a core with a secondary winding of wire wound about the primary winding. In addition, an electrical current under a high voltage is usually passed through the primary winding to induce a current of lower voltage in the secondary winding. During this time, an electric current travels through the length of each wire coil from one end to the other producing the effects described above.

In the past, transformers of relatively large size, for example, of 20 KVA which are used in power transmission generate a hum or buzz during operation which is usually objectionable to personnel working in the surrounding environment or to people living in the surrounding environment. In addition, heat is generated in the windings and where excessive must be dissipated to avoid a melt-down.

In the past, attempts to obtain more efficient electrical transformers, electrical generators and the like have usually concentrated on the constructional aspects of these devices rather than on the electrical circuitry for these devices. As a result, efficiencies which can be obtained have been relatively limited.

Accordingly, it is an object of the invention to provide an electrical circuit which permits an increase in efficiency to be obtained in electrical apparatus such as transformers, generators, induction motors, and the like.

It is another object of the invention to increase the efficiency of a transformer in a relatively simple manner.

It is another object of the invention to provide a relatively simple electrical circuit to permit a reduction in size of a transformer, generator, or motor of a given output.

It is another object of the invention to provide an electrical circuit which permits a decrease in the amount of current required for the circuit to perform a given amount of work.

Briefly, the invention provides an electrical circuit wherein a pair o coils of electrically conductive wire are coiled about a common axis in mirror image symmetrical relation to each other and connected in parallel electrically. To this end, a common tap is connected to one end of each coil in order to conduct an electrical current thereto while a second common tap is connected to a second end of each of the coils to conduct the electrical current therefrom.

The mirror image symmetry of the coils is believed to have the effect of increasing the flow rate of current through the circuit by decreasing the inductive time constant. This constant (T) is the ratio of the inductance (L) measured in Henries to the resistance (R) measured in Ohms. In this respect, the inductive time constant is reduced because the current travels a shorter distance from tap to tap as compared with a single coil between the two taps or a pair of coils in series between the taps. Further, there is an increase in the magnetic lines of flux which are generated as compared with a single coil of the same coil length.

In one embodiment, the electrical circuit can be incorporated into an inductance conductor, for example by winding the two coils about a bar of magnetizable material. When the coils are energized, the bar becomes magnetized and can be used in a conventional manner.

In another embodiment, the electrical circuit can be incorporated into a transformer. In this case, a primary winding formed of a pair of mirror image wound coils is wound about a core while a secondary winding also composed of a pair of mirror image wound coils is disposed concentrically about the primary winding and the core. The transformer also has a common tap connected to one end of each coil of the primary winding and a common tap connected to the remaining ends of each coil of the primary winding. In like manner, a pair of taps are connected to the secondary winding.

It is believed that the mirror image winding of both the primary winding coils and the secondary winding coils provides an increase in the magnetic lines of flux so that there is an increased efficiency in the use of such a transformer. For example, when comparing a conventionally wound transformer with primary and secondary windings and a rated resistance of 125 Ohms for stepping down a voltage of 110 V to 3 V, a transformer wound in accordance with the invention with the same resistance provides a step-down voltage of 5.8 V for an input voltage of 110 V. Thus, an efficiency of almost 100% can be achieved. Further, this efficiency can be achieved with a reduction in the size of the wire used for winding the transformer. Also, it has been found that for the same output, a transformer can be constructed with mirror image wound coils so as to operate at a lower amperage than the conventionally wound transformer.

The electrical circuit can also be incorporated into an electrical generator. In this respect, the generator would be wound in similar fashion to a transformer as described above.

In another embodiment, the electrical circuit can be incorporated into a motor. In this respect, the motor is constructed with a rototable shaft and an electromagnetic drive for rotating the shaft. The drive, in turn, includes a magnetizable bar having a North pole and a South pole in spaced facing relation and a pair of coils of electrically conductive wire coiled in mirror image symmetrical relation about the bar and connected in parallel to conduct an electrical current therethrough in order to magnetize the bar for driving the shaft.

These and other objects and advantages of the invention will become more apparent from the following detailed description and accompanying drawings in which.

Figure 1:
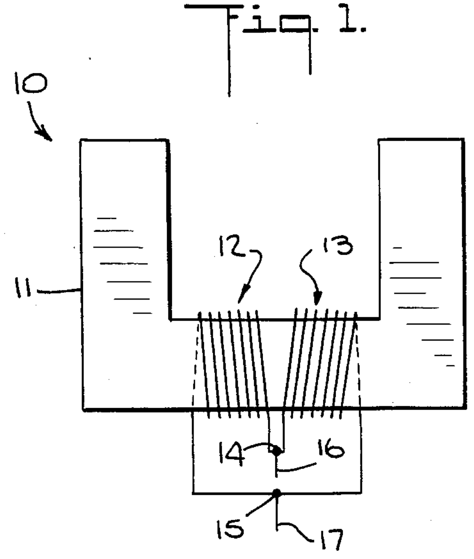
FIG. 1 is a perspective view of a coiled inductance conductor constructed in accordance with the invention.
Figure 2:
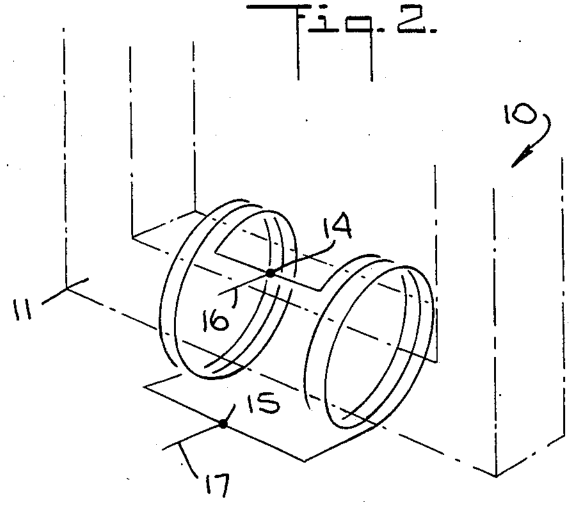
FIG. 2 is a side view of the conductor shown in FIG. 1.

Referring to FIGS. 1 and 2, the inductance conductor 10 includes a U-shaped bar 11 of magnetizable material and a pair of coils 12, 13 of electrically conductive wire, each of which is coiled about a base of the bar 11 and thus about a common axis. Further, the coils 12, 13 are wound in mirror image symmetry to each other and with an equal number of turns.

In addition, a common tap 14 or like means is connected to one end of each coil 12, 13 in order to conduct an electrical current into the coils 12, 13 in order to magnetize the bar 11 while a second tap 15 is connected in common to the remaining ends of each coil 12, 13 in order to conduct the electrical current therefrom. In this regard, the coils 12, 13 are connected in parallel between the taps 14, 15. Suitable leads 16, 17 are also connected to the respective taps 14, 15 to conduct an electrical current.

In order to wind the coils 12, 13 about the bar 11, the bar 11 is mounted in a suitable rotatable jig or the like and a pair of wires of equal size and material are thereafter wound simultaneously about the bar 11 from the center of the bar 11 outwardly. The two ends of the wires leading to the bar 11 can then be connected to the common tap 14 while the two trailing ends of the wires can be connected to the common tap 15. The taps can be subsequentially connected to the leads 16, 17 or vice versa.

The inductance conductor 10 can be used for any suitable purpose for which previously known inductance conductors have been constructed. For example, the inductance conductor may be incorporated in a choke or ballast for a fluorescent-type light bulb in order to smooth a DC current.

Figure 4:
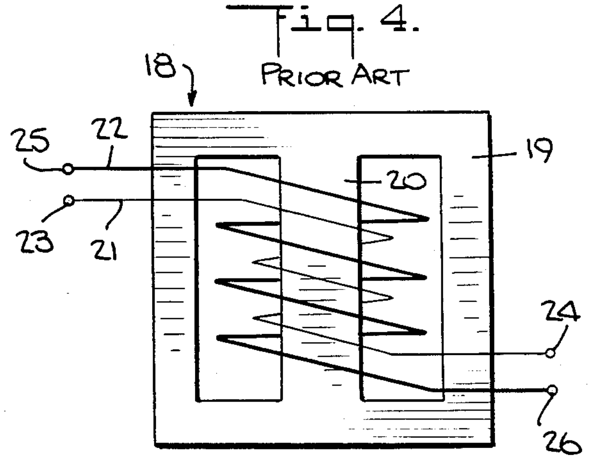
Fig. 4. PRIOR ART
FIG. 4 depicts a conventional transformer of the prior art.

Referring to FIG. 4, as is known, a conventional transformer 18 is usually constructed of a bobbin 19 having a magnetizable core 20 around which a primary winding 21 and a secondary winding 22 are wound. For example, the primary winding 21 is usually coiled about the core 20 in one or more laminations or layers while the secondary winding 22 is wound about the primary winding in another series of laminations or layers. These laminations are shown schematically in FIG. 4.

In addition, the primary winding is usually connected between suitable taps 23, 24 for the flow of current while the secondary winding 22 is connected between a separate pair of taps 26 for the flow of current. Usually, the windings 21, 22 are wound of wires of a dissimilar number of turns so that an input voltage can be stepped-down to a lower voltage.

Figure 5:
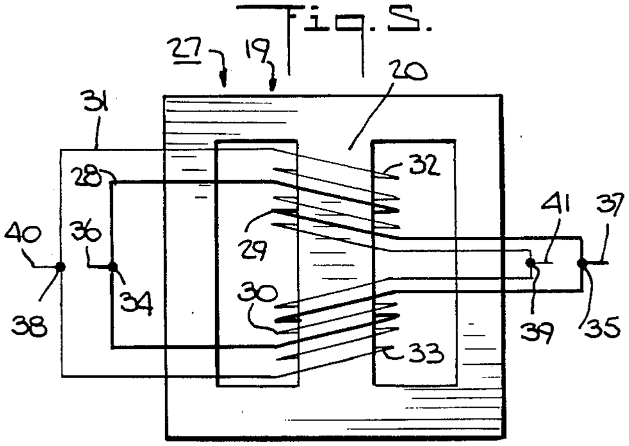
FIG. 5 is a transformer constructed in accordance with this invention.
Figure 6:
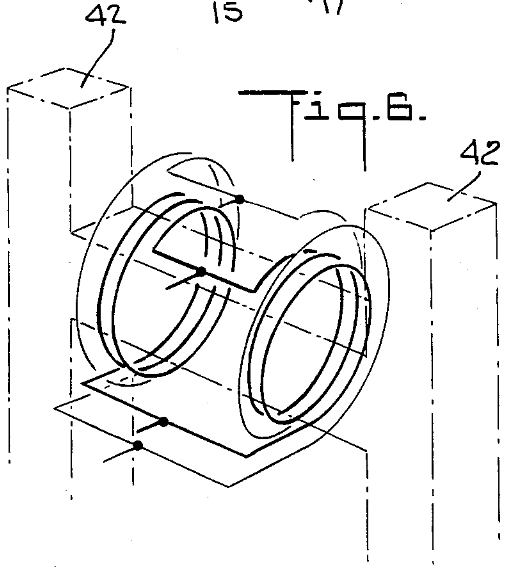
FIG. 6 is a side view of the transformer shown in FIG. 5.

Referring to FIGS. 5 and 6, wherein like reference characters indicate like parts as above, a transformer 27 employing an electrical circuit in accordance with the invention has a primary winding 28 formed of a pair of coils 29, 30 of electrically conductive wire wound in mirror image symmetry about the core 20. In addition, a secondary winding 31 includes a pair of coils 32, 33 which are wound in mirror image symmetry about the core 20. In this respect, the secondary winding 31 is disposed concentrically about the primary winding 28 and an insulating sheath (not shown) is concentrically disposed between the windings 28, 31.

As indicated in FIG. 5, the wire used for the coils 29, 30 of the primary winding 28 are thinner than the wires used for the coils 32, 33 of the secondary winding 31.

The coils 29, 30 of the primary winding 28 are also connected in parallel between and to a pair of common taps 34, 35 with suitable electrical leads 36, 37 being connected to the respective taps 34, 35 to conduct a flow of current through the primary winding 28. Likewise, the coils 32, 33 of the secondary winding 31 are connected in parallel between and to a pair of taps 38, 39 each of which is connected to a suitable lead 40, 41 in order to conduct a current therethrough.

By way of example, a step-down transformer was constructed in accordance with the circuit indicated in FIG. 5 and compared with a conventionally wound transformer having a circuit as indicated in FIG. 4.

The conventional step-down transformer had a primary winding 21 formed of No. 32 wire while the, secondary winding 22 was formed of a coil of No. 18 wire and was wound to provide a primary resistance of 125 Ohms and a secondary resistance of 0.20 Ohms so as to step down a voltage of 117 volts to 3.09 volts.

The step-down transformer constructed in accordance with FIG. 5 used thinner wire than that of the conventional transformer in order to obtain a rated resistance of 250 Ohms for each coil. To this end, the primary coils 29, 30 were wound of No. 40 wire while the coils 32, 33 of the secondary winding 31 were wound with No. 22 wire. In addition, each coil 29, 30 of the primary winding 28 had 1000 turns in 10 layers or 100 turns per layer to give a resistance of 125 Ohms. The coils 32, 33 of the secondary winding 31 had 65 turns in 5 layers or 13 turns per layer to give a resistance of 0.4 Ohmsfor each coil. A non-rerrous metal sheath, for example, of copper, was located concentrically between the windings 28, 31 in order to insulate the windings from each other.

When the conventional step-down transformer was subjected to an input voltage of 117 volts, the output voltage was 3.09 volts; however, when the transformer wound in accordance with FIG. 5 was subjected to the same input voltage, the transformer provided an output of 5.77 volts or nearly double the output of the conventionally wound transformer.

A transformer can also be wound in the manner indicated in FIG. 5 so as to provide the same output as a conventional transformer, for example 3 volts in the above example, in which case, less current would be used, for example to illuminate a light bulb. Testing has indicated that there is a reduction of about 25% to 33% less current used.

Referring to FIG. 6, a transformer may be constructed with a core 20, connected to a pair of flanges 42 so that the core and flanges define a bobbin. Such a bobbin can be incorporated into other structures in order to complete a transformer.

Figure 3:
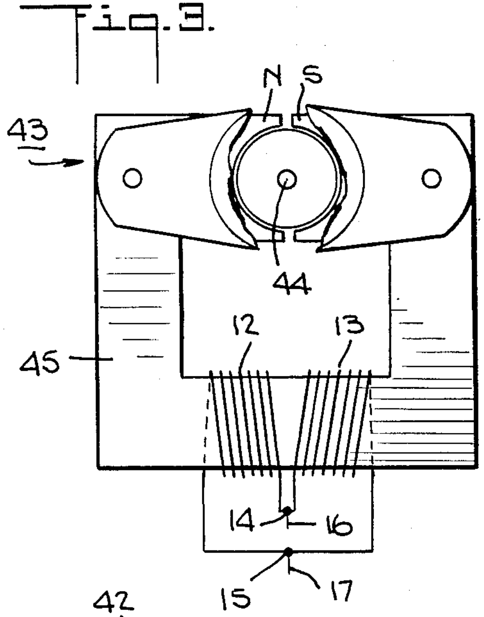
FIG. 3 is an illustrative example of the motor which utilizes the invention.

Referring to FIG. 3, wherein like reference characters indicate like parts as above, the electrical circuit, for example as shown in FIG. 1 can also be incorporated into a motor 43. As indicated, the motor 43 is constructed as a conventional shaded pole motor and need not be further described. As indicated, the motor 43 includes a rotatable shaft 44, for example for driving a fan (not shown). In addition, the motor 43 has an electromagnetic drive for rotating the shaft 44. This drive includes a magnetizable bar 45 having a North pole and a South pole in spaced facing relation and a pair of coils 12, 13 of electrically conductive wire coiled in mirror image symmetrical relation about the bar 45 and connected in parallel to conduct an electrical current therethrough to magnetize the bar 45 for driving the shaft 44.

Again, in comparing a motor 43 wound in the manner indicated in FIG. 3 for driving a fan with a motor wound in conventional fashion, i.e. with a single coil of wire about a bar 45, the motor constructed in accordance with FIG. 3 provided faster acceleration than the conventional motor as well as a greater velocity to the fan. Further, after current was shut off from each motor, it was found that the fans decelerated to a stop in substantially the same time. In essence, the motor constructed in accordance with FIG. 3 provided a greater output than the conventional motor. Also, for the same output, a motor wound in accordance with FIG. 3 requires about 25% less amperage.

The invention thus provides an electrical circuit which is capable of increasing the efficiency of existing electrical motors, transformers, generators and like electrical apparatus.

Further, the invention provides an electrical circuit which is capable of reducing the size and weight of electrical apparatus such as motors, transformers and generators for a given output. Still further, the use of the electrical circuit, for example, in a transformer can reduce the amount of heat generated during transformation of a voltage while also eliminating or substantially reducing the hum normally associated with large tranformers.

What is claimed is:

1. An inductance conductor comprising
a bar of magnetizable material;
a first coil of electrically conductive wire coiled about said bar;
a second coil of electrically conductive wire of equal resistance to said first coil coiled about said bar in mirror image symmetrical relation to said first coil;
a first common tap means connected to one end of said coils to conduct an electrical current sumultaneously thereto to magnetize said bar; and
a second common tap means connected to a second end of each of said coils to conduct an electrical current sumultaneously therefrom.

2. An inductance conductor as set forth in claim 1 wherein said bar is U-shaped with said coils wound about a base of said bar.

3. An inductance conductor as set forth in claim 1 wherein said bar is made of metallic material.

4. An inductance conductor as set forth in claim 1 wherein said first coil has a resistance of 250 ohms and said second coil has a resistance of 250 ohms.

5. A transformer comprising
a core;
a primary winding on said core including a pair of coils of electrically conductive wire wound in mirror image symmetry about said core; and
a secondary winding on said core including a pair of coils of electrically conductive wire wound in mirror image symmetry about said core.

6. A transformer as set forth in claim 5 wherein said secondary winding is disposed concentrically about said primary winding.

7. A transformer as set forth in claim 6 wherein said coils of said primary winding are of thinner diameter that said coils of said secondary winding.

8. A transformer as set forth in claim 5 wherein said primary winding has a resistance of 250 Ohms and said secondary winding has a resistance of 0.4 Ohms.

9. A transformer as set forth in claim 5 which further comprises a first common tap connected to one end of each coil of said primary winding to conduct an electrical current thereto, a second common tap connected to a second end of each coil of said primary winding to conduct an electrical current therefrom, a third common tap connected to one end of each coil of said secondary winding to conduct an electrical current thereto and a fourth common tap connected to a second end of each coil of said secondary winding to conduct an electrical current therefrom.

10. A transformer as set forth in claim 5 which further comprises a pair of flanges secured to opposite ends of said core to define a bobbin.

11. A transformer as set forth in claim 5 wherein said primary and said secondary windings have a respective resistance to step down a delivered voltage from 110 volts to 5.8 volts.

12. A transformer as set forth in claim 11 wherein said primary winding has a resistance of 250 Ohms.

13. A transformer as set forth in claim 5 wherein said wire of said primary winding is a No. 40 wire and said wire of said secondary winding is No. 26 wire and wherein each coil of said primary winding has 1000 turns in 10 laminations and each coil of said secondary winding has 13 turns in 5 laminations.

14. A transformer as set forth in claim 5 which further comprises an insulating sheath concentrically between said windings.

15. A motor comprising
a rotatable shaft; and
an electromagnetic drive for rotating said shaft, said drive including a magnetizable bar having a North pole and a South pole in spaced facing relation and a pair of coils of electrically conductive wire of equal resistance coiled in mirror image symmetrical relation about said bar and connected in parallel to conduct an electrical current simultaneously therethrough to magnetize said bar for driving said shaft.

16. An electrical circuit comprising
a pair of coils of electrically conductive wire equal resistance coiled about a common axis in mirror image symmetrical relation to each other;
a common tap connected to one end of each of said coils to conduct an electrical current simultaneously thereto; and
a common tap connected to a second end of each of said coils to conduct an electrical current simultaneously therefrom.

* * * * *

UNITED STATES PATENT AND TRADEMARK OFFICE
CERTIFICATE OF CORRECTION

PATENT NO. : 4,806,834
DATED : Feb. 21, 1989
INVENTOR(S) : Erl Koenig

It is certified that error appears in the above-identified patent and that said Letters Patent is hereby corrected as shown below:

Cover page, line 54 change "Earl" to -Erl-
Column 2, line 13 change "o" to -of-
Column 4, line 7 change "taps 26" to -taps 25, 26-
Column 4, line 56 change "ohmsfor" to -ohms for"
Column 4, line 56 change "non-rerrous" to -non-ferrous-
Column 5, line 59 change "said coils" to -each of said coils-
Column 6, line 16 change "that" to -than-
Column 6, line 59 change "wire equal" to -wire of equal-
Column 6, line 41 change "26" to -22-

Signed and Sealed this
Nineteenth Day of December, 1989

*Attest:*

JEFFREY M. SAMUELS

*Attesting Officer* *Acting Commissioner of Patents and Trademarks*